June 17, 1952

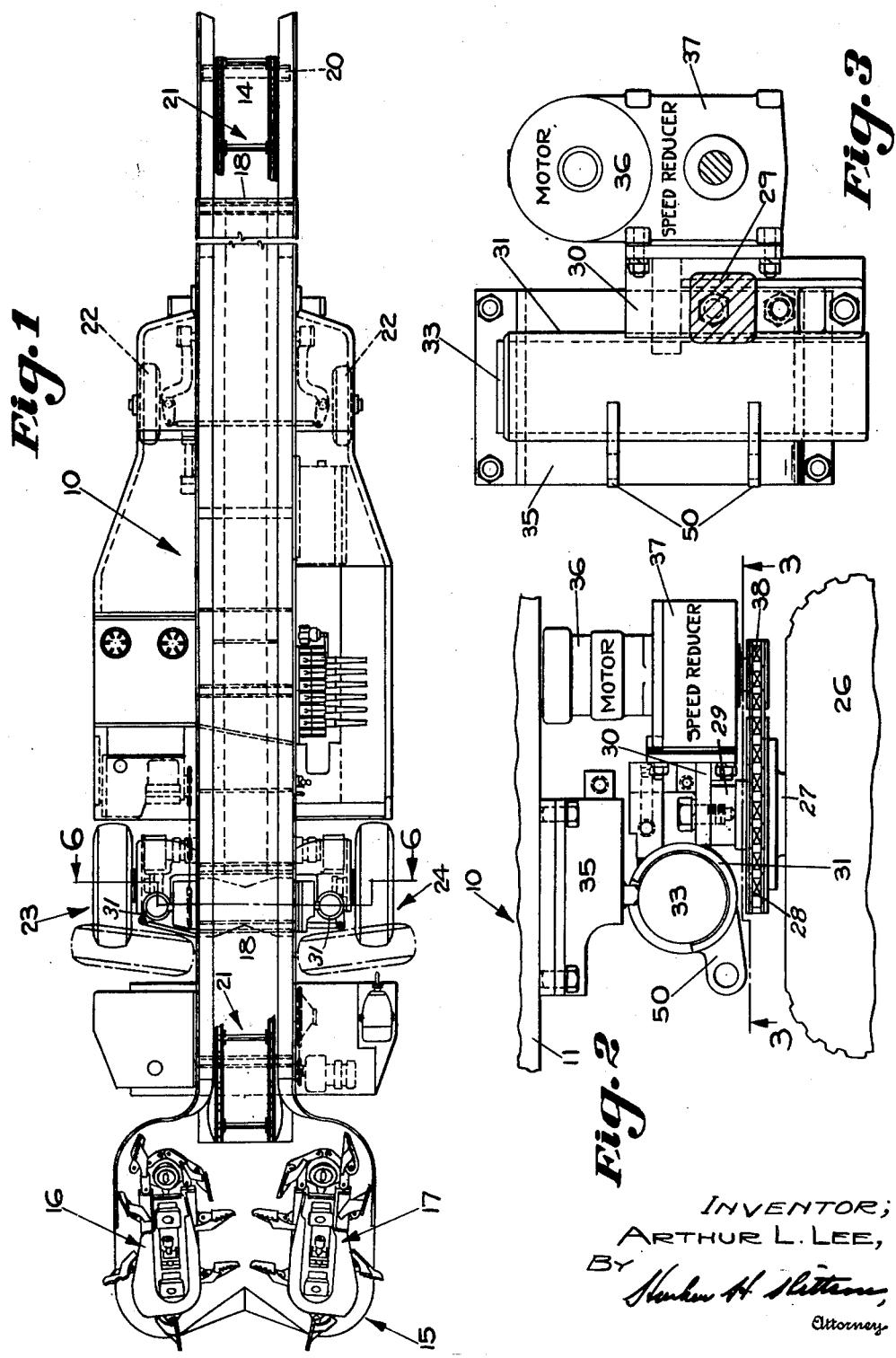

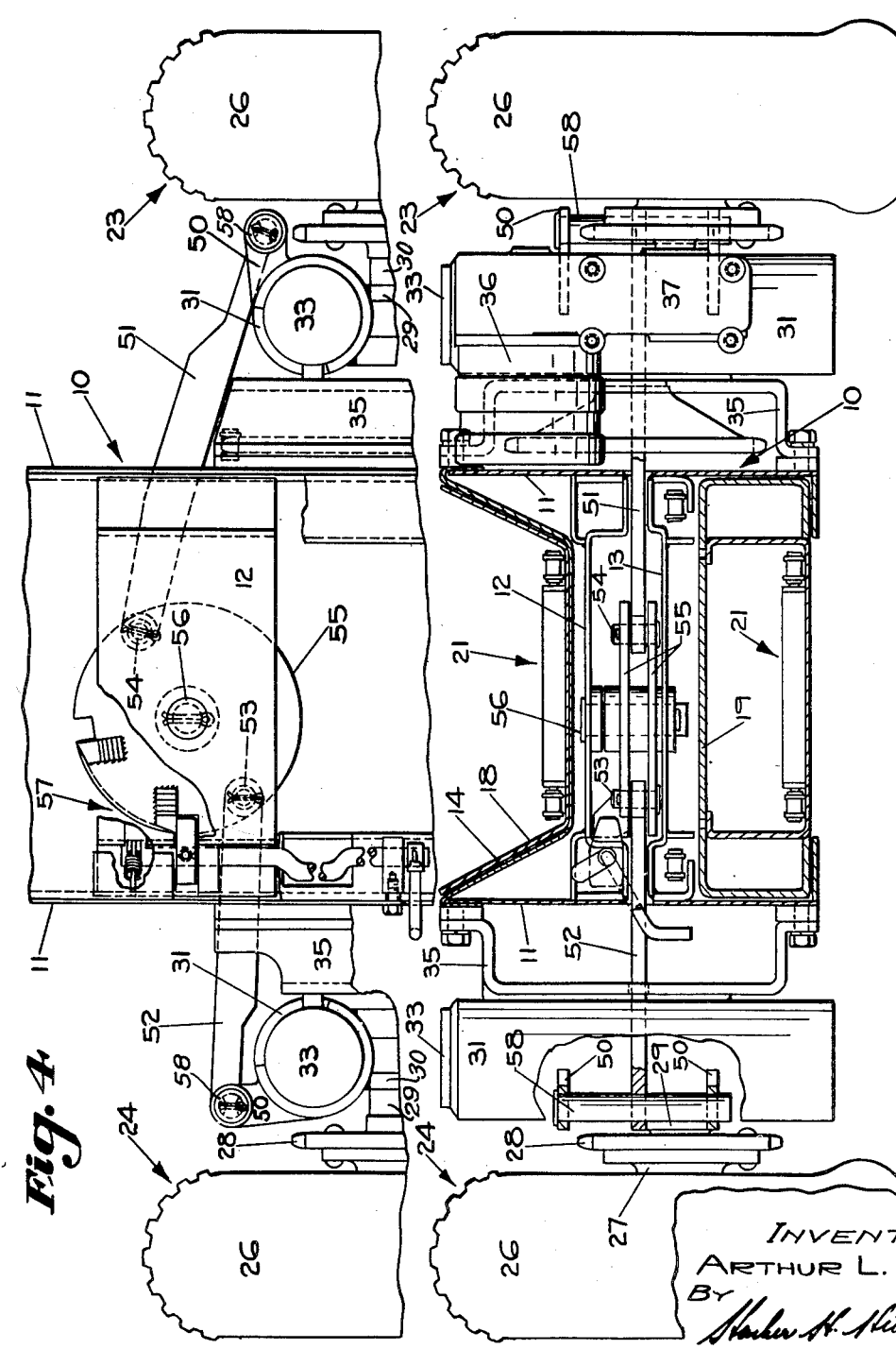

A. L. LEE 2,600,663

DRIVEN STEERING WHEEL ASSEMBLY FOR COAL LOADERS

Original Filed Dec. 3, 1947

INVENTOR;
ARTHUR L. LEE,
By
Attorney

INVENTOR;
ARTHUR L. LEE,
BY
Attorney

Patented June 17, 1952

2,600,663

UNITED STATES PATENT OFFICE 2,600,663

DRIVEN STEERING WHEEL ASSEMBLY FOR COAL LOADERS

Arthur L. Lee, Upper Arlington, Ohio, assignor to The Jeffrey Manufacturing Company, a corporation of Ohio Original application December 3, 1947, Serial No. 789,382. Divided and this application February 5, 1949, Serial No. 74,751

3 Claims. (Cl. 180—43)

This invention relates to a loading machine and traction wheel assembly therefor and one object of the invention is to provide an improved loading machine including an improved traction wheel assembly.

Another object of the invention is to provide an improved loading machine in which a traction wheel assembly for carrying the main frame of the loading machine is mounted thereto for rectilinear movement along a generally upright axis and the traction wheel assembly includes a driving mechanism preferably, but not necessarily, positioned at one side and within the radial confines of the wheel thereof for driving it which driving mechanism follows the movements of the wheel along the upright axis, and preferably, but not necessarily, to provide a motor means for moving the traction wheel assembly along the upright axis.

Another object of the invention is to provide an improved loading machine in which a traction wheel assembly for carrying the main frame of the loading machine is mounted thereto for both rectilinear and rotary swinging movements along and about a generally upright axis and the traction wheel assembly includes a driving mechanism preferably, but not necessarily, positioned at one side and within the radial confines of the wheel thereof for driving it which driving mechanism follows the movements of the wheel along and about the upright axis.

In carrying out the foregoing objects it is another object of the invention to provide a motor means for moving the wheel assembly along the upright axis which motor means when operated simultaneously with the wheel driving mechanism causes the traction wheel assembly to move rectilinearly along the upright axis while it is rotated therearound by the wheel.

Other objects of the invention will appear hereinafter, the novel features and combinations being set forth in the appended claims.

In the accompanying drawings:

Fig. 1 is a plan view of a loading machine incorporating the features of my invention;

Fig. 2 is an enlarged plan view showing particularly the mounting and driving mechanism for one of the traction wheels;

Fig. 3 is a sectional view taken on the line 3—3 of Fig. 2, looking in the direction of the arrows;

Fig. 4 is a plan view showing particularly the locking and interconnecting mechanism for the two traction wheels, parts of the loader being removed;

Fig. 5 is a sectional elevational view through the loader near the traction wheels, with parts omitted and other parts broken away;

Figure 6:
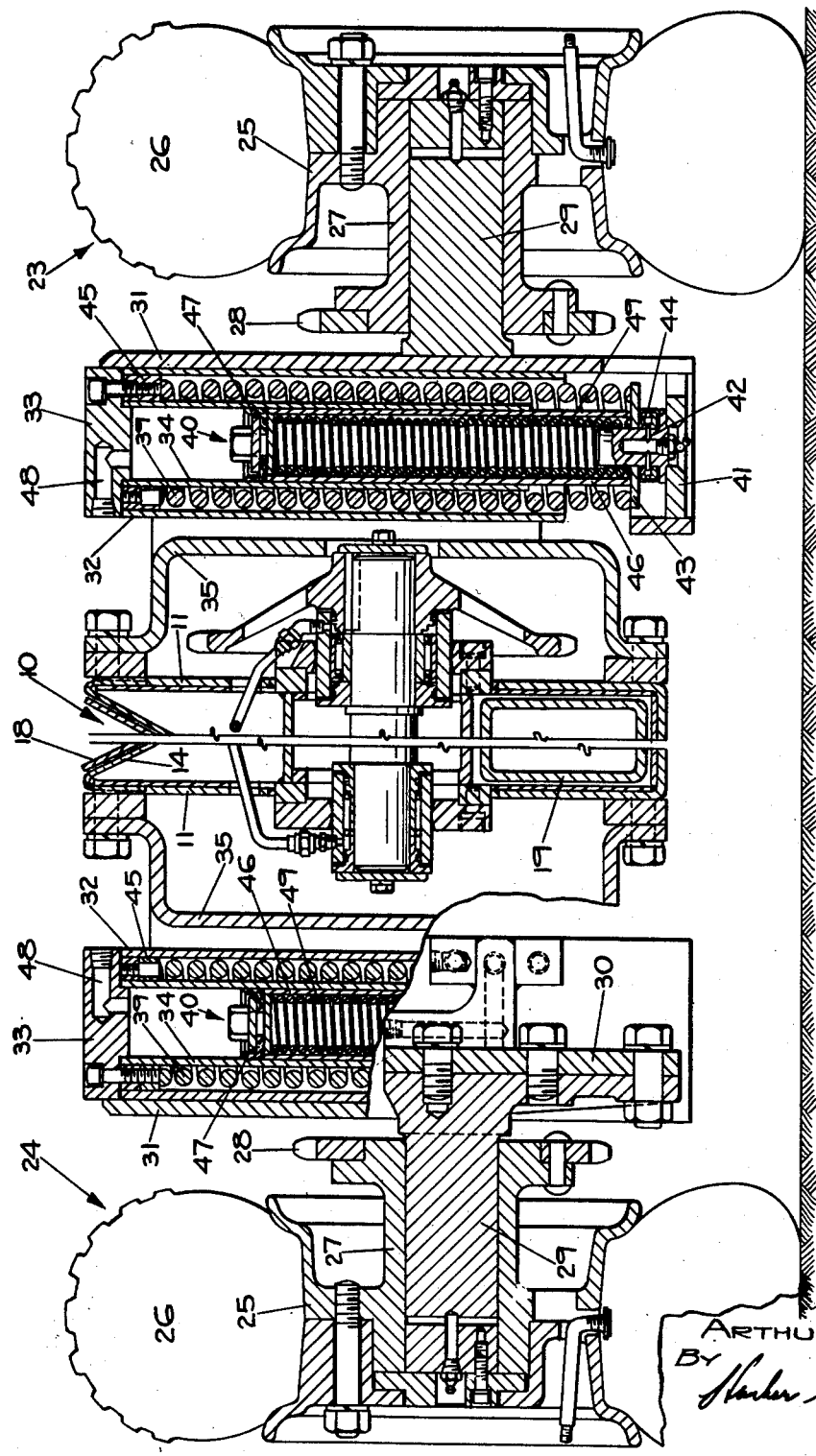
Fig. 6 is a sectional elevational view taken on the line 6—6 of Fig. 1, looking in the direction of the arrows.

This application is a division of my application Serial No. 789,382, filed December 3, 1947, entitled Underground Loading Machine, which is a continuation in part of my application Serial No. 530,361, filed April 10, 1944, entitled Loading Machine, now Patent No. 2,589,827, dated March 18, 1952, and my application Serial No. 755,162, filed June 17, 1947, and since abandoned, entitled Underground Loading Machine.

Referring particularly to Figs. 1, 4 and 5 of the drawings, the loading machine in its general arrangement of parts will be only briefly described, since they are described and disclosed in full detail in my application Serial No. 530,361, (Patent No. 2,589,827) above identified. Said loading machine includes a main frame 10 which is formed by a pair of laterally spaced longitudinally extending generally horizontal upright frame plates 11, 11 interconnected by a large number of cross members including two cross plates 12 and 13 (see Fig. 5). The upper portion of the main frame 10 includes a trough 14.

Adjacent the front of the loading machine there is a gathering head 15 provided with a pair of laterally spaced gathering conveyers 16 and 17 which are adapted to gather material as the head 15 is forced into said material and to convey it rearwardly over the bottom plate of said gathering head 15, delivering it to the front end of a sliding trough 18 which overlaps the trough 14, as clearly illustrated in Fig. 5 of the drawings. The gathering head 15 is carried by an elongated telescoping boom 19 (see Fig. 5) which telescopes into the lower portion of the main frame 10 and is supported for reciprocatory motion relative thereto. Forward and rearward feeding movement of the gathering head 15 relative to the main frame 10 is effected by feeding means disclosed in detail in my above identified application, Serial No. 530,361 (Patent No. 2,589,827).

Extending through the overlapping troughs 14 and 18 and between a discharge foot shaft 20 on the former and a driving shaft for the gathering conveyers 16 and 17 on the latter is an endless chain and flight conveyer 21 which is reeved about guide pulleys, as disclosed in detail in my application Serial No. 530,361 (Patent No. 2,398,827) in a manner to provide for feeding rectilinear forward and rearward motion of the head section 15 while the main frame 10 is held against rectilinear or longitudinal movement, with the discharge of right-hand end thereof anchored against rectilinear movement while the loader is free to swing about said upright anchorage axis to effect positioning of the head 15 for gathering operations. Anchoring means of any desired form may be used, such as that disclosed in my application Ser. No. 530,361 (Patent No. 2,589,827).

The disclosed loader is a unitary machine and is entirely self-propelling, that is, it is self-transporting and it may be run about a mine to any desired location. To provide for this there is a pair of steering wheels 22 which support the rear end of the loader while it is being transported, said wheels being elevatable so as to lift them off the ground when the loader is anchored, as above mentioned, for loading coal. The detailed structure of said wheels 22 is disclosed in my application Serial No. 530,361. (Patent No. 2,589,827).

Near the front end of the loader there is a pair of traction wheel assemblies 23 and 24 which are of generally similar construction. These traction wheel assemblies 23 and 24 provide the traction means for the loader when it is being run under its own power from one place to another in a mine room, during which the wheels are substantially parallel as illustrated in full lines in Fig. 1 of the drawings. Their construction is such that the wheels may be swung simultaneously inwardly to a generally tandem position, as illustrated in dotted lines in Fig. 1 of the drawings, whereupon they may be operated to swing the complete loader in an arc, the center of which is the upright pivotal axis adjacent the rear end above mentioned.

Since the wheel assemblies 23 and 24 are of similar construction, a description of one will suffice for both and similar reference characters will be used to designate similar integral parts of each. Each of said traction wheel assemblies 23 and 24 includes a split rim wheel 25 carrying a pneumatic tire 26. Wheel 25 has a hub 27 provided with a drive sprocket 28 and for practical purposes the wheel 25 and tire 26 may be considered within the generic expression "wheel," particularly as employed in the claims. Hub 27 is journaled on a stub axle 29 which is removably but rigidly attached to a bracket 30 which includes a heavy cylinder 31 welded thereto. The internal surface of the cylinder 31 is preferably smooth and provides a bearing surface to receive the external smooth bearing surface of a telescoping cylinder 32, said telescoping cylinder 32 having a rigidly but removably connected head 33, which head 33 carries an internal cylinder 34 which is inside but spaced from the cylinder 32. Adjacent its inner wall the cylinder 32 is rigidly attached to and may be considered a part of a bracket 35, the bracket 35 being attached at its top and bottom to side plates 11 of the main frame 10. The sprocket 28 is driven from hydraulic motor 36 through a speed reducer 37 and chain and sprocket drive mechanism 38.

As clearly illustrated in Figs. 2 and 3 of the drawings, the motor 36 and the speed reducer 37 are removably bolted and thus rigidly but removably attached to the bracket 30 at one side of the cylinder 31 thereof. The motor 36 and speed reducer 37 lie at one side of the wheel 25—26 and between it and the side plate 11 of the main frame 10 of the loader and they lie substantially within the radical confines of the wheel 25—26, that is, the motor 36 and speed reducer 37 lie at one side of the wheel 25—26 and within a cylindrical area of the same diameter as the tire 26 and the term "substantially within the radial confines of the traction wheel" or its equivalent, as employed in the claims, is to be construed as meaning a driving mechanism which lies for the most part within said cylindrical area. It is thus evident that the motor 36 and speed reducer 37 of each traction wheel assembly 23 and 24 partake of all movements of the axle 29 thereof and as hereinafter described each of the traction wheel assemblies 23 and 24 is both vertically adjustable and rotatably swingable about a vertical axis simultaneously, the vertical adjustment providing for adjusting the elevation of the forward end of the loading machine and the rotary adjustment of the traction wheel assemblies providing for swinging the traction wheels to tandem positions, as indicated at Fig. 1 of the drawings, in which position they swing the entire loader about the aforementioned anchorage axis adjacent its rear or discharge end.

From the above description it is evident that the outer cylinder 31 is directly connected to the stub axle 29 and that the inner cylinder 32 is directly connected to the main frame 10. The telescoping relation between the two together with their close fit provides for up and down movement of the wheel 25, 26 on an upright axis and also provides for swinging movement of the wheel 25, 26 on said upright axis. The load is transferred from the main frame 10 through the bracket 35 and cylinder 32 to the outer cylinder 31 of stub axle 29 and wheel 25, 26 through a heavy compressible helical spring 39 and through an expansible single acting hydraulic jack or reciprocating motor including the inner cylinder 34 and a cylinder type piston assembly 40 associated therewith, as hereinafter described.

At its lower end the cylinder 31 is provided with a head 41 carrying an upstanding post 42 along its upright central axis, upon which post is a bearing plate 43 mounted upon a thrust bearing 44 which transfers the load of the bearing plate 43 to the head 41 and thence to the cylinder 31. The bottom of the heavy compression spring 39 rests on the bearing plate 43 and the head supports a ring 45 which is rigidly attached to the cylinder head 33 and to the two cylinders 32 and 34, said ring 45 acting as a spacer for said two cylinders 32 and 34 and providing a space between them within which the compression spring 39 can operate. Said compression spring 39 assists in transferring part of the weight or load of main frame 10 to axle 29 and wheels 25, 26.

The principal load, however, between the main frame 10 and the wheels 25, 26 is carried through the hydraulic motor including the cylinder 34 and the piston assembly 40. To this end the piston assembly 40 includes a telescoping cylinder 46, the external surface of which has a close fit with the internal surface of cylinder 34 and being free to reciprocate therein, being provided with a fluid type leather or composition sealing head 47 so as to cause an expansion of the reciprocating hydraulic jack upon the delivery of hydraulic fluid to the interior of cylinder 34 through a feed conduit 48 in the head 33. In other words, the main frame 10 can be elevated or lowered with respect to the wheels 25, 26 by feeding hydraulic fluid under pressure to the interior of cylinder 34 or allowing it to escape therefrom. Control means for the expansible jacks of the wheel assemblies 23, 24 is disclosed in detail in my application Serial No. 530,361 (Patent No. 2,589,827).

Within the cylinder 46 is a relatively weak helical spring 49 which at its top bears against the head 47 of piston assembly 40 and which at its bottom bears against the bearing plate 43. This insures there being an upward pressure against the piston assembly 40 even if a wheel 25, 26 should drop into a hole so as to move the bearing plate 43 out of contact with the bottom of cylinder 46, as these two are not rigidly attached together but merely have bearing contact under normal conditions. In other words, the load is actually transferred in part through the compression spring 39 and in part and to a normally greater extent through the cylinder 46 and the bearing plate 43.

As best illustrated in Fig. 1 of the drawings, the two wheel assemblies 23 and 24 are adapted to be swung approximately ninety degrees (90°) inwardly or toward each other from their parallel positions, and to this end the two cylinders 31 of the two assemblies 23 and 24 are interconnected by means of integral arms 50 (see Figs. 4 and 5) on said cylinders 31 which are pivotally connected together through transversely and oppositely extending pivot links 51, 52 connected to wheel assemblies 23 and 24, respectively, which links 51 and 52 have their inner ends pivotally connected to pins 53 and 54, respectively, carried between a pair of upper and lower circular discs 55 which are pivoted at their aligned centers to a pivot pin 56 which extends between and is carried by the previously mentioned cross plates 12 and 13. Releasable locking mechanism designated generally at 57 is provided in association wtih the rotatable discs 55 operable to latch the wheel assemblies 23 and 24 either in their parallel or substantially tandem positions, all as disclosed in full detail in my application Serial No. 530,361, (Patent No. 2,589,827).

The traction wheel assemblies 23, 24 may be swung from their parallel positions to their tandem positions and vice versa, merely by releasing the locking mechanism 57 and driving the wheels 25, 26 by means of their driving mechanisms including motors 36 and speed reducers 37 to travel in the directions in which it is desired to rotate the traction wheel assemblies about their mounting axes. Because the mounting axis of each traction wheel assembly 23, 24 is generally upright and is spaced or positioned at one side of the wheel 25, 26 when the wheel 25, 26 is driven, the entire traction wheel assembly 23, 24 rotates about the upright axis and thus the wheel driving motors 36 may alone be relied upon to swing the interconnected traction wheel assemblies from their parallel to their tandem positions or they may aid or cooperate with another motor in swinging the traction wheels as disclosed in the application of Sterling C. Moon, Serial No. 607,927, filed July 31, 1945, and since abandoned, entitled Loading Machine.

Since the links 51 and 52 necessarily move up and down with the main frame 10, it is evident that they must likewise move up and down with respect to the outer cylinder 31. To provide for this there is a sliding connection between the outer end of each link 51 and 52 and the arms 50 provided by an elongated pin 58 which extends between upper and lower arms 50, as illustrated in detail in Fig. 5 of the drawings.

Figure 7:
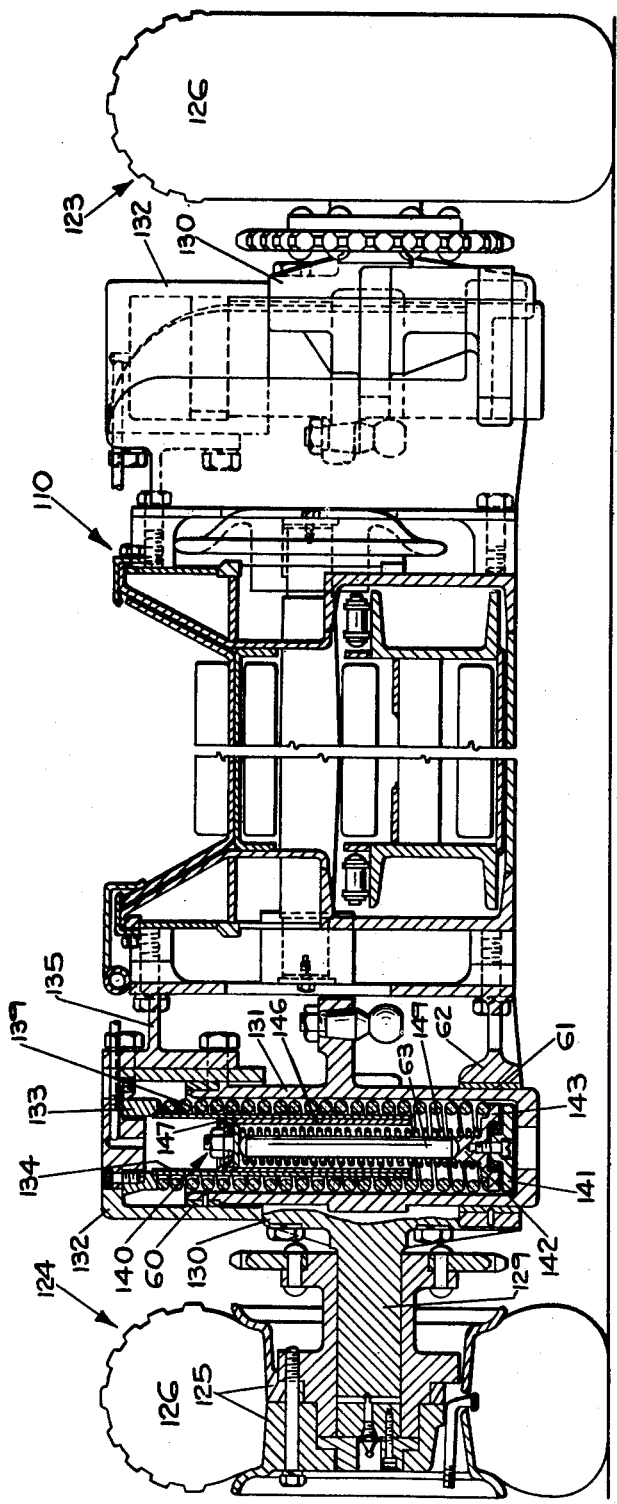
Fig. 7 is a sectional elevational view through the loader showing one of the wheels and mounting means in section, with the other in elevation, of a modified form of loader.

In Fig. 7 of the drawings I have illustrated a modified form of mechanism involving a pair of traction wheel assemblies for supporting the main frame from the traction wheels. As here illustrated, there is a slightly different form of main frame designated 110 supported from a pair of wheel assemblies 123 and 124, it being understood that the wheel assemblies 123 and 124 correspond in general to the wheel assemblies 23 and 24 above described. Wheel assemblies 123 and 124 are of similar construction. Each includes a stub axle 129 which supports an individually power driven traction wheel 125 including a pneumatic tire 126 in a manner similar to that in which wheel 25, 26 is driven as above described.

Stub axle 129 is carried on a bracket 130 attached to a cylinder 131 and in effect forming a part thereof, the top of which is provided with a bronze bushing or bearing 60 which slides on the cylindrical inner surface of a relatively short cylinder 132 having an integral head and attached to and in effect forming a part of a bracket 135 which in turn is attached to the main frame 110. The lower portion of the cylinder 131 has its outer surface machined and it slides in a bronze bushing 61 carried in a lower bracket 62 rigidly attached to the bottom of the main frame 110. Cylinder 131 is thus guided for rectilinear up and down movement along its vertical or upright axis with respect to the cylinder 132, and it is also free to swing about said axis. A portion of the load of the main frame 110 is transferred to a wheel assembly 123, 124 through a heavy helical spring 139, the upper end of which presses on a removable ring 133 attached to the interior of the integral head of cylinder 132, the lower end of said spring 139 resting on a bearing plate 143 which is mounted for free rotation on a complementary bearing plate 141 which in turn rests on the bottom integral head of the cylinder 131. Thus a portion of the load of the main frame 110 is transferred to a wheel 125, 126 through the compression spring 139.

Vertical adjustment of the wheel 125, 126 relative to the main frame 110 is effected through a reciprocating hydraulic cylindrical jack or motor generally similar to that above described but differing in one particular, as hereinafter pointed out. Said hydraulic jack or motor includes a cylinder 134 which is concentric with the cylinder 131 and spaced therefrom, acting as a guide for the compression spring 139 and on its inner surface cooperating with a similar type piston assembly 140 including a cylinder 146 having close sliding relation with the cylinder 134 and provided with a wiping fluid tight sealed head 147.

Unlike the somewhat similar cylinder 46, cylinder 146 does not normally contact the associated bearing plate 143 but terminates substantially above it, and the load is transferred from the piston assembly 140 to the bearing plate 143 through a floating compression rod 63 which has semi-cylindrical upper and lower ends, the upper one of which abuts a bearing plate of the piston assembly 140, the lower one of which abuts the upper concave surface of a central post 142 of bearing plate 143. A helical spring 149 also abuts the bearing plate of piston assembly 140 and extends over the post 142 and at its lower end abuts bearing plate 143 for a purpose similar to that performed by spring 49, as above described. Spring 149 also acts to hold the floating thrust rod 63 in proper position, keeping it in contact with its proper bearing surfaces. It has been found that this floating thrust rod 63 is particularly desirable to prevent any binding in the expansible hydraulic motor or jack arrangement of the wheel assemblies 123, 124.

The mechanism for swinging the wheels 125, 126 from their normally parallel positions to their substantially tandem positions differs from that above described and is disclosed in detail and claimed in the application of S. C. Moon, Serial No. 754,516, filed June 13, 1947, now Patent No. 2,591,584, dated April 1, 1952, but since this particular mechanism per se forms no part of the present invention it will not be described in detail. It is sufficient to say that the mechanism provides for the swinging adjustment of the two wheel assemblies 123 and 124 about the upright axes of their hydraulic motor assemblies or, in other words, about axes parallel with the axes of the concentric cylinders, such as cylinder 134 of each assembly.

While other details of the loader which is illustrated in Fig. 7 differ somewhat from that above described, they are not of particular significance in connection with the invention herein disclosed and claimed and consequently need no specific description. It may be stated, however, that these details are disclosed in the Moon application Serial No. 754,516 (Patent No. 2,591,584), above identified.

Obviously those skilled in the art may make various changes in the details and arrangement of parts without departing from the spirit and scope of the invention as defined by the claims hereto appended, and applicant wishes therefore not to be restricted to the precise construction herein disclosed.

Having thus described and shown an embodiment of the invention, what it is desired to secure by Letters Patent of the United States is:

1. A loader including a main frame, traction wheel assembly means for supporting said frame including a wheel receiving axle, a traction wheel having a chain receiving sprocket associated therewith for driving it carried by said axle, a cylinder attached to said axle having a generally upright axis extending at one side of said traction wheel and sprocket, hydraulic motor and speed reducer means including a drive sprocket carried by said cylinder at one side thereof and at one side of and substantially within the radial confines of said traction wheel, chain means interconnecting said sprockets for driving said traction wheel from said hydraulic motor and speed reducer means, bracket means connecting said cylinder and main frame including a cylinder having its axis common with the axis of said first named cylinder and carrying the latter for simultaneous rectilinear movement and rotary swinging movement along and about said generally upright axis, and hydraulic piston motor means within said cylinders for adjusting said traction wheel assembly along said upright axis relative to said second named cylinder, said traction wheel being drivable at least to aid in swinging said traction wheel assembly about said upright axis.

2. A traction wheel assembly adapted to support the main frame of a vehicle including a wheel receiving axle, a traction wheel having a chain receiving sprocket associated therewith for driving it on said axle, a cylinder attached to said axle having a generally upright axis extending at one side of said traction wheel and sprocket, said cylinder being adapted to be received by a bracket means on said main frame for both rectilinear movement and rotary swinging movement along and about said upright axis, hydraulic motor and speed reducer means including a chain receiving drive sprocket carried by said cylinder at one side thereof and at one side of and substantially within the radial confines of said traction wheel, and chain means interconnecting said sprockets for driving said traction wheel from said hydraulic motor and speed reducing means.

3. A traction wheel assembly adapted to support the main frame of a vehicle including a wheel receiving axle, a traction wheel having a chain receiving sprocket associated therewith for driving it on said axle, bracket means attached to said axle having a generally upright axis extending at one side of said traction wheel and sprocket, said bracket means being adapted to be received by a second bracket means on said main frame for both rectilinear movement and rotary swinging movement along and about said upright axis, hydraulic motor and speed reducer means including a chain receiving drive sprocket carried by said first named bracket means at one side thereof and at one side of and substantially within the radial confines of said traction wheel, and chain means interconnecting said sprockets for driving said traction wheel from said hydraulic motor and speed reducing means.

ARTHUR L. LEE.

REFERENCES CITED

The following references are of record in the file of this patent:

UNITED STATES PATENTS

| Number | Name | Date |
|---|---|---|
| 672,713 | Sanchis | Apr. 23, 1901 |
| 866,410 | Walker | Sept. 17, 1907 |
| 1,080,447 | Hoadley | Dec. 2, 1913 |
| 1,828,905 | Mossay | Oct. 27, 1931 |
| 2,173,339 | Myers | Sept. 19, 1939 |
| 2,220,254 | Maier | Nov. 5, 1940 |
| 2,430,528 | Moon | Nov. 11, 1947 |
| 2,441,054 | Ardussi et al. | May 4, 1948 |
| 2,488,520 | Beck | Nov. 22, 1949 |

FOREIGN PATENTS

| Number | Country | Date |
|---|---|---|
| 311,084 | Great Britain | May 9, 1929 |
| 553,009 | France | Feb. 1, 1923 |
| 839,771 | France | Jan. 7, 1939 |